United States Patent [19]

Shoji

[11] Patent Number: 4,973,235
[45] Date of Patent: Nov. 27, 1990

[54] MOLD FOR MANUFACTURING A SKIN COVERED FOAMED PLASTIC ARTICLE INCORPORATING A HOLE

[75] Inventor: Makoto Shoji, Ayase, Japan

[73] Assignee: Ikeda Bussan Co., Ltd., Kanagawa, Japan

[21] Appl. No.: 412,945

[22] Filed: Sep. 26, 1989

[30] Foreign Application Priority Data

Oct. 31, 1988 [JP] Japan ............................ 63-142206[U]

[51] Int. Cl.⁵ ...................... B29C 39/10; B29C 39/26
[52] U.S. Cl. ...................... 425/4 R; 249/91; 249/94; 249/96; 249/175; 264/46.4; 425/117; 425/125; 425/577
[58] Field of Search ............ 264/46.6, 46.4, 46.8; 425/117, 125, 388, 577, DIG. 48, 4 R, 817 R; 249/122, 125, 142, 175, 184, 83, 85, 91, 95, 94, 96

[56] References Cited

U.S. PATENT DOCUMENTS

| 4,379,104 | 4/1983 | Koorevaar | 264/46.4 |
| 4,420,447 | 12/1983 | Nakashima | 425/817 R |
| 4,833,741 | 5/1989 | Mizuno et al. | 264/46.6 |

FOREIGN PATENT DOCUMENTS

| 2408777 | 9/1975 | Fed. Rep. of Germany | 264/46.8 |
| 3507522 | 9/1986 | Fed. Rep. of Germany | 264/46.6 |
| 56-89926 | 7/1981 | Japan | 264/46.4 |
| 57-61532 | 4/1982 | Japan | 264/46.8 |
| 0867377 | 5/1961 | United Kingdom . |
| 0964203 | 7/1964 | United Kingdom . |
| 1087944 | 10/1967 | United Kingdom . |
| 1228172 | 4/1971 | United Kingdom . |
| 2190621 | 11/1987 | United Kingdom . |
| 2198080 | 6/1988 | United Kingdom . |

*Primary Examiner*—Jay H. Woo
*Assistant Examiner*—Khanh P. Nguyen
*Attorney, Agent, or Firm*—Weiser & Stapler

[57] ABSTRACT

A mold for manufacturing a skin covered foamed plastic article incorporating a hole, with which it is possible to place the skin cover at a desired position despite of the presence of the hole, without spoiling or damaging the skin cover, such that the skin covered foamed plastic article of a desired shape without any deficiencies such as wrinkles and dents can easily be manufactured. The mold includes a lower mold having a cylindrical bossing with a hollow inside, corresponding to the hole, around which the skin cover is placed in such a manner that an edge of a hole on the skin cover is located in the hollow inside the cylindrical bossing, the cylindrical bossing being in such a shape that the hollow inside the cylindrical bossing is shielded off from the cavity when the lower mold is assembled with the upper mold so that the liquid foam resin cannot enter into the hollow; and a fastening cap, to be attached to the cylindrical bossing over the skin cover, for fastening the skin cover to the cylindrical bossing at a desired position.

7 Claims, 3 Drawing Sheets

4,973,235

MOLD FOR MANUFACTURING A SKIN COVERED FOAMED PLASTIC ARTICLE INCORPORATING A HOLE

BACKGROUND OF THE INVENTION

1. Field of the Invention

The present invention relates to a mold for manufacturing a foamed plastic article such as that to be used for a car seat cushion or a seat back, and more particularly, to such a mold suitable for manufacturing a foamed plastic article which incorporates a hole.

2. Description of the Background Art

Car seat cushions and seat backs have been made of skin covered foamed plastic articles comprising a pad member covered by a skin cover. The pad member and the skin cover were previously manufactured separately and combined together later, but it has become fashionable to manufacture a skin covered pad member altogether by forming foamed plastic in a skin cover laid over a mold, so that the process of combining at a later time may be omitted.

In the manufacturing process for such a skin covered foamed plastic seat, it has conventionally been necessary to use adhering means such as double sided adhesive tapes and a fastening means such as clips to attach edges of the skin cover to the lower mold so as to place the skin cover at a desired position. However, the use of such adhering means often causes problems of spoiling the surface skin of the skin cover because of the excessively strong adherence or damaging the wadding provided on the back of the surface skin when removing the adhering means from the manufactured skin covered foamed plastic seat.

In addition, the skin covered foamed plastic seat to be utilized as a car seat back, for example, often incorporates a head rest formed together, with a hole provided between the seat back portion and the head rest portion. In manufacturing such a skin covered foamed plastic seat with a built-in head rest, it has been difficult to place the skin cover over the lower mold in such a manner that no wrinkle appears on the skin cover of the manufactured skin covered foamed plastic seat in a vicinity of the hole associated with the head rest.

Furthermore, conventionally, such a skin covered foamed plastic set with a built-in head rest requires a difficult special treatment at the edge of the skin cover at the hole associated with the head rest in order to produce a final product of a sufficient quality to be offered for sale.

SUMMARY OF THE INVENTION

It is therefore an object of the present invention to provide a mold for manufacturing a skin covered foamed plastic article incorporating a hole, with which it is possible to place the skin cover at a desired position despite of the presence of the hole, without spoiling or damaging the skin cover, such that the skin covered foamed plastic article of a desired shape without any deficiencies such as wrinkles and dents can easily be manufactured.

This object is achieved by the present invention by providing a mold for manufacturing a skin covered foamed plastic article comprised of a pad member covered by a skin cover, which incorporates a hole, the mold comprising: an upper mold; a lower mold, to be assembled with the upper mold in order to form a cavity in which a liquid foam resin undergoes a foaming process to become the pad member, over which a skin cover is to be placed, the lower mold including: a cylindrical bossing with a hollow inside, corresponding to the hole to be made on the skin covered foamed plastic article to be manufactured, around which the skin cover is placed in such a manner that an edge of a hole on the skin cover is located in the hollow inside the cylindrical bossing, the cylindrical bossing being in such a shape that the hollow inside the cylindrical bossing is shielded off from the cavity when the lower mold is assembled with the upper mold so that the liquid foam resin cannot enter into the hollow; and means, to be attached to the cylindrical bossing over the skin cover, for fastening the skin cover to the cylindrical bossing at a desired position.

Other features and advantages of the present invention will become apparent from the following description taken, in conjunction with the accompanying drawings.

DETAILED DESCRIPTION OF THE PREFERRED EMBODIMENTS

Figure 1:
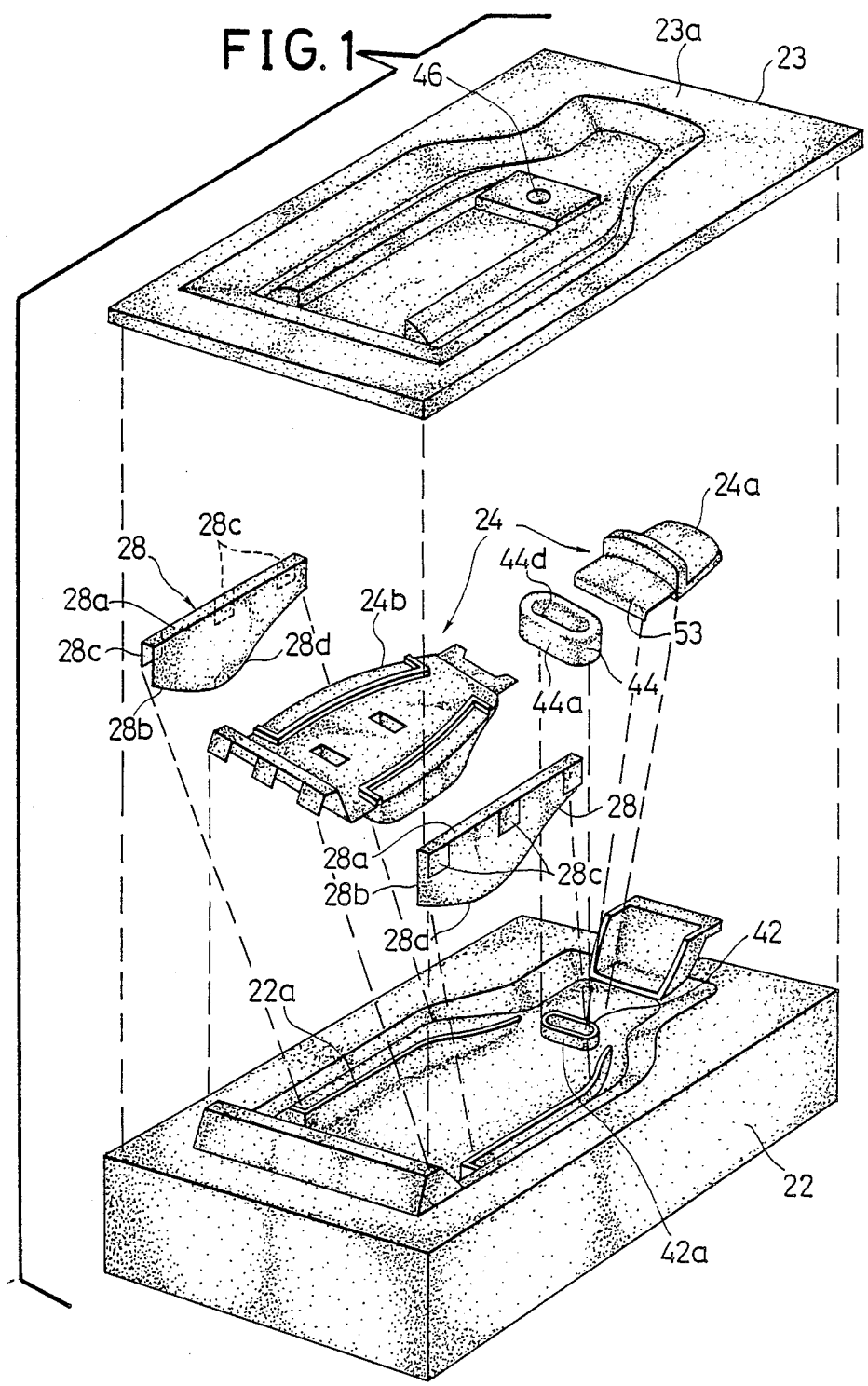
FIG. 1 is an expanded view of one embodiment of a mold for manufacturing a skin covered foamed plastic article according to the present invention.

Referring now to FIG. 1, there is shown one embodiment of a mold for manufacturing a skin covered foamed plastic article according to the present invention.

In this embodiment, a mold comprises a lower mold 22, an upper mold 23 to be assembled with the lower mold 22, and a middle mold 24 to be inserted between the lower mold 22 and the upper mold 23. The middle mold 24 is divided into a front piece 24a and a rear piece 24b. In addition, there is a pair of side plates 28 to be attached to the lower mold 22.

Figure 2:
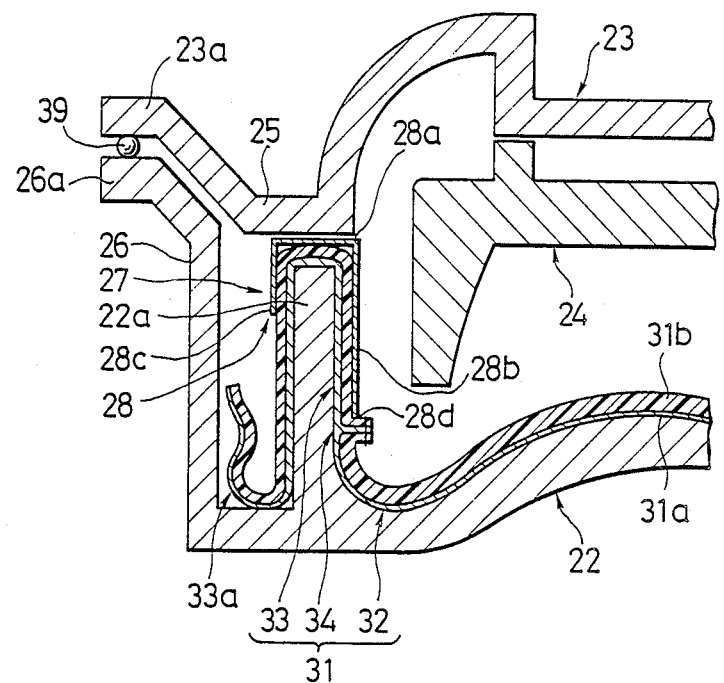
FIG. 2 is a partial transverse cross sectional view of the mold of FIG. 1.

A partial transverse cross sectional view of this mold in a state of being assembled is shown in FIG. 2.

As shown, a skin cover 31 comprised of a surface skin 31a and a wadding 31b is to be placed over the lower mold 22. This skin cover 31 is divided into a main portion 32 corresponding to a flat face of a skin covered foamed plastic seat to be manufactured, and a side portion 33 corresponding to a side edge of the skin covered foamed plastic seat to be manufactured, which are joined together at a sewn portion 34.

The lower mold 22 has an inner side wall 22a and an outer side wall 26 between which a spacing 27 is formed. The skin cover 31 is placed over this lower mold 22 in such a manner that the main portion 32 is laid over a bottom face of the lower mold 22 while the side portion 33 is wrapped around the inner side wall 22a so that an edge 33a of the side portion 33 is placed inside the spacing 27. The side portion 33 is fastened around the inner side wall 22a by means of one of the side plate 28 to be attached around the inner side wall 22a over the side portion 33.

The side plate 28 comprises a top piece 28a to cover a top edge of the inner side wall 22a, an inner side piece 28b to extend along an inner side of the inner side wall 22a, and outer side pieces 28c to extend into the spacing 27 along an outer side of the inner side wall 22a. The inner side piece 28b has a lower edge 28d curved in such a shape as to fit along the sewn portion 34, so that a position of the skin cover 31 can be secured when the side plate 28 is attached to the inner side wall 22a over the side portion 33. In this side plate 28, at least the inner side piece 28b should be made of metal or a synthetic resin plate which is sufficiently heat resistive and chemical resistive and also easily detachable from foamed plastic material.

The upper mold 23 has a dented portion 25 to be placed directly over the inner side wall 22a when assembled such that the spacing 27 is shielded off from inside of the inner side wall 22a of the lower mold 22, and an extended edge 23a to be placed over an extended edge 26a of the lower mold 22 with a packing 39 in between.

Figure 3:
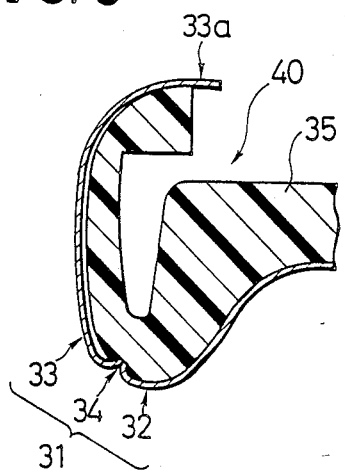
FIG. 3 is a partial transverse cross sectional view of a skin covered foamed plastic seat manufactured by the mold of FIG. 1.

With the middle mold 24 placed between the lower mold 22 and the upper mold 23, the liquid foam resin will be poured into a cavity formed by the lower mold 22, upper mold 23, and middle mold 24, so that the skin covered foamed plastic seat 40 comprising a foamed plastic pad member 35 covered by the skin cover 31, which has partial transverse cross section shown in FIG. 3, can be obtained.

Figure 4:
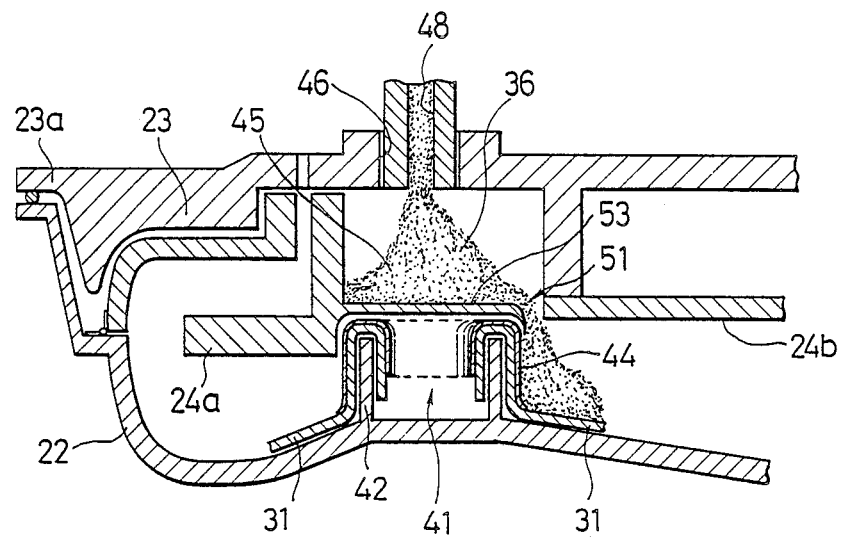
FIG. 4 is a partial longitudinal cross sectional view of the mold of FIG. 1.

On the other hand, a partial longitudinal cross sectional view of this mold in a state of being assembled, in a vicinity of the front piece 24a of the middle mold 24, is shown in FIG. 4.

In this region, the lower mold 22 has a cylindrical bossing 42 with an elliptical cross section corresponding to a hole to be made on the skin covered foamed plastic seat to be manufactured. The skin cover 31 will be placed over the lower mold 22 such that the cylindrical bossing 42 is covered by the skin cover 31, with an edge of a hole provided on the skin cover 31 placed inside the cylindrical bossing 42. The skin cover 31 is fastened to the cylindrical bossing 42 by means of a fastening cap 44 to be attached to the cylindrical bossing 42 over the skin cover 31. The fastening cap 44 has an elliptical cross section to fit with the cylindrical bossing 42, and is either ring shaped as in FIG. 4, or cup shaped by including a bottom 45 indicated by dashed lines in FIG. 4.

The front piece 24a of the middle mold 24 has an elliptical plate portion 53 which will be located directly over a hollow 41 inside the cylindrical bossing 42 when assembled, so as to close this hollow 41.

The upper mold 23 has an opening 46 which will be located directly over the elliptical plate portion 53 when assembled, through which the liquid foam resin 36 to become the foamed plastic pad member 35 after the foaming process is completed will be poured from an injection nozzle 48 into the cavity formed by the lower mold 22, upper mold 23, and middle mold 24. As shown in FIG. 4, the liquid foam resin 36 will hit the elliptical plate portion 53 first, and then flows further down, onto the skin cover 31 placed over the lower mold 22, through a passage 51 formed between the front piece 24a and the rear piece 24b.

Here, since the liquid foam resin 36 does not fall directly onto the skin cover 31, it is possible to prevent the penetration of the liquid foam resin 36 into the skin cover 31 due to a high pressure caused by the direct fall of the liquid foam resin 36.

Moreover, since the spacing 27 and the hollow 41 are shielded off from the cavity into which the liquid foam resin 36 is poured, the edges of the skin cover 31 will be left as free ends when the pad member 35 is formed, so that these edges can receive a proper treatment afterwards very easily.

Furthermore, the side plates 28 and the fastening cap 44 can secure the position of the skin cover with respect to the lower mold 22, so that it is possible to place the skin cover 31 at a desired position, even though the hole is involved in the skin covered foamed plastic seat 40 to be manufactured, without spoiling or damaging the skin cover 31, such that the skin covered foamed plastic seat 40 of a desired shape without any deficiencies such as wrinkles and dents can easily be manufactured.

It is to be noted that although in the above embodiment, the spacing 27 is formed by the inner side wall 22a and the outer side wall 26 of the lower mold 22, this feature may alternatively be furnished by providing the similar inner and outer side walls on the upper mold 23, instead of being provided on the lower mold 22.

Besides this, many modifications and variations of the above embodiment may be without departing from the novel and advantageous features of the present invention. Accordingly, all such modifications and variations are intended to be inclined within the scope of the appended claims.

What is claimed is:

1. A mold manufacturing a skin covered foamed plastic article comprised of a pad member covered by a skin cover, the article having a hole therein and the skin cover having an inner edge for surrounding the hole, and the mold comprising:

an upper mold;

a lower mold, to be assembled with the upper mold to form a cavity in which a liquid foam resin undergoes a foaming process to become the pad member, and over which the skin cover is to be placed, the lower mold including:

a cylindrical bossing defining a hollow and which extends to an open top edge, for receiving the inner edge of the skin cover for surrounding the hole of the skin covered foamed plastic article so that the hollow contains the inner edge of the skin cover when the skin cover is placed over the lower mold;

means for attachment to the top edge of the cylindrical bossing when the skin cover is placed over the lower mold with the inner edge contained in the hollow, for fastening the skin cover to the cylindrical bossing; and means for shielding off the hollow of the cylindrical bossing from the cavity of the mold when the lower mold is assembled with the upper mold so that the liquid foam resin cannot enter into the hollow.

2. A mold according to claim 1, wherein the attachment means is a cap member disposed over the top edge of the bossing.

3. A mold according to claim 2, wherein the attachment means is a cup-shaped cap fitting over the top edge of the bossing.

4. A mold according to claim 2, wherein the attachment means is a ring-shaped cap fitting over the top edge of the bossing.

5. A mold according to claim 4, wherein the shielding means is a separate plate member mounted to portions of the mold and extending over the top edge of the bossing.

6. A mold for manufacturing a skin covered foamed plastic article comprised of a foamed pad chamber covered by a flexible skin cover, the article having a hole therein and the skin cover having an inner edge for surrounding the hole, and the mold comprising:
 an upper mold;
 a lower mold to be combined with the upper mold to form a cavity for receiving a liquid foam resin for forming the foamed pad member and including an upper surface for receiving the skin cover, and a hollow, cylindrical bossing extending from the upper surface of the lower mold to an open edge, for receiving the skin cover so that the inner edge of the skin cover is placed over the open edge and extends into the hollow of the cylindrical bossing; and
 means for attachment to the open edge of the cylindrical bossing for fastening the skin cover to the cylindrical bossing.

7. A mold according to claim 6, wherein the attachment means includes means for sealing off the hollow of the bossing, and the contained inner edge of the skin cover, from the foam receiving cavity.

* * * * *